(12) United States Patent
Park et al.

(10) Patent No.: US 11,977,311 B2
(45) Date of Patent: May 7, 2024

(54) VIEWING ANGLE ADJUSTING MEMBER AND ELECTRONIC DEVICE INCLUDING THE SAME

(71) Applicant: SAMSUNG ELECTRONICS CO., LTD., Suwon-si (KR)

(72) Inventors: Taesoon Park, Suwon-si (KR); Junyoung Kim, Suwon-si (KR); Kwansik Min, Suwon-si (KR); Sanghee Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 17/547,878

(22) Filed: Dec. 10, 2021

(65) Prior Publication Data

US 2022/0187673 A1   Jun. 16, 2022

(30) Foreign Application Priority Data

Dec. 11, 2020   (KR) .................. 10-2020-0173070

(51) Int. Cl.
*G02F 1/167*   (2019.01)
*G02F 1/137*   (2006.01)
*G02F 1/1675*   (2019.01)

(52) U.S. Cl.
CPC ............. *G02F 1/167* (2013.01); *G02F 1/137* (2013.01); *G02F 2001/1678* (2013.01); *G02F 2202/36* (2013.01)

(58) Field of Classification Search
CPC ... G02F 1/167; G02F 1/137; G02F 2001/1678
See application file for complete search history.

(56) References Cited

U.S. PATENT DOCUMENTS

2008/0039702 A1\* 2/2008 Hayter ............... A61B 5/14546
600/345
2014/0320782 A1\* 10/2014 Uhm ................. G02F 1/133528
359/275

FOREIGN PATENT DOCUMENTS

| KR | 10-2004-0094066 A | 11/2004 |
| KR | 10-0809645 B1 | 3/2008 |
| KR | 10-2008-0036802 A | 4/2008 |

\* cited by examiner

*Primary Examiner* — Lucy P Chien
(74) *Attorney, Agent, or Firm* — Sughrue Mion, PLLC

(57) ABSTRACT

A viewing angle adjusting member and an electronic device including the same are provided. The viewing angle adjusting member includes a first transparent film including a first transparent electrode layer, a second transparent film including a second transparent electrode layer, and a blocking material provided between the first transparent film and the second transparent film and containing nanoparticles configured to block light. The viewing angle adjusting member may be configured to adjust a position of the nanoparticles according to an electrical signal applied to at least one of the first transparent electrode layer and the second transparent electrode layer.

16 Claims, 9 Drawing Sheets

VIEWING ANGLE ADJUSTING MEMBER AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2020-0173070, filed on Dec. 11, 2020, in the Korean Intellectual Property Office, the disclosure of which is incorporated by reference herein in its entirety.

BACKGROUND

1. Field

Various embodiments relate to an electronic device, e.g., an adjusting member capable of adjusting the viewing angle of a display and/or an electronic device including the same.

2. Description of Related Art

The growth of electronics, information, and communication technologies leads to integration of various functions into a single electronic device. For example, smartphones pack the functionalities of a sound player, imaging device, and scheduler, as well as having communication functionality and, on top of that, may implement more various functions by having applications installed thereon. An electronic device may not only be equipped applications or stored files but also access, wiredly or wirelessly, a server or another electronic device to receive, in real-time, various pieces of information.

The electronic device may include a display to provide visual information in the form of text, image, and/or video. By including a touchscreen function, the display may be used not only as an output device but also as an input device, allowing the electronic device to be more portable and usable. The visual information provided through the display may be shown not only to the user himself but also to other people around him. For example, when the portable electronic device is used in a public place, information that needs to remain secure, such as password or user private information required for use of various contents, may be exposed to others.

A measure for maintaining security is to allow only a limited number of people to view the display by installing a screen or partition around the display or by limiting the viewing angle on the display itself. However, although the screen or partition may be used in an environment in which the display is installed in a substantially fixed position, use of the screen or partition in an environment using a portable electronic device, such as a smart phone, may be limited. In utilizing portable electronic devices or displays, such as smart phones, tablet PCs and/or laptop computers, the viewing angle needs to be restricted when a single user reads, writes, or processes information requiring security and, when multiple users simultaneously view videos or documents using one device, a wide viewing angle may be needed. For example, if a display having a structure with a limited viewing angle is applied, the utility of the electronic device that is used while on the move may be reduced.

SUMMARY

Provided are an adjusting member capable of adjusting the viewing angle of the display and an electronic device including the same.

Also provided are a viewing angle adjusting member capable of reducing the viewing angle of the display when security is required and, as necessary, expanding the viewing angle of the display and an electronic device including the same.

Additional aspects will be set forth in part in the description which follows and, in part, will be apparent from the description, or may be learned by practice of the presented embodiments.

In accordance with an aspect of the disclosure, a viewing angle adjusting member includes a first transparent film including a first transparent electrode layer; a second transparent film including a second transparent electrode layer; and a blocking material provided between the first transparent film and the second transparent film, the blocking material including nanoparticles configured to block light, wherein the viewing angle adjusting member is configured to adjust a position of the nanoparticles according to an electrical signal applied to at least one of the first transparent electrode layer and the second transparent electrode layer.

The viewing angle adjusting member may be configured to selectively transmit light incident on one surface of the viewing angle adjusting member according to an incident angle of the incident light by adjusting a height of the nanoparticles.

The viewing angle adjusting member may further include a transparent resin provided between the first transparent film and the second transparent film to form a plurality of slits at a designated interval, and wherein the blocking material is disposed in the plurality of slits.

When viewed from one surface of the viewing angle adjusting member, at least some of the plurality of slits may be arranged parallel to each other.

The plurality of slits may be formed with a width of 10 μm or more and 50 μm or less.

The plurality of slits may be arranged at the designated interval of 30 μm or more and 150 μm or less.

The blocking material may include an electronic ink comprising a mixture of a solvent, a dispersing agent, and the nanoparticles, and wherein the nanoparticles are charged in an electric field and moved to block light.

The nanoparticles may include black inorganic ink microparticles of at least one selected from among special black, lamp black, and black spinel.

In accordance with an aspect of the disclosure, an electronic device includes a housing; a display provided on one surface of the housing; and a viewing angle adjusting member provided on a surface of the display, wherein the viewing angle adjusting member includes a first transparent film including a first transparent electrode layer; a second transparent film including a second transparent electrode layer; and a blocking material disposed between the first transparent film and the second transparent film, the blocking material including nanoparticles configured to block light, and wherein the viewing angle adjusting member is configured to adjust a position of the nanoparticles according to an electrical signal applied to at least one of the first transparent electrode layer and the second transparent electrode layer.

The viewing angle adjusting member may be configured to selectively transmit light incident on one surface of the viewing angle adjusting member according to an incident angle of the incident light by adjusting a height of the nanoparticles.

The electronic device may further include a transparent resin provided between the first transparent film and the second transparent film to form a plurality of slits at a designated interval, and wherein the blocking material is disposed in the plurality of slits.

When viewed from a surface of the viewing angle adjusting member, at least some of the plurality of slits may be arranged parallel to each other.

The plurality of slits may be formed with a width of 10 μm or more and 50 μm or less.

The plurality of slits may be arranged at the designated interval of 30 μm or more and 150 μm or less.

The blocking material may include an electronic ink including a mixture of a solvent, a dispersing agent, and the nanoparticles, and the nanoparticles may be charged in an electric field and moved to block light.

The nanoparticles may include black inorganic ink microparticles of at least one selected from among special black, lamp black, and black spinel.

The electronic device may further include a processor configured to apply the electrical signal to the at least one of the first transparent electrode layer and the second transparent electrode layer to adjust the position of the nanoparticles.

The electronic device may further include a transparent resin provided between the first transparent film and the second transparent film to form a plurality of slits at a designated interval, and wherein the blocking material is disposed in the plurality of slits.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
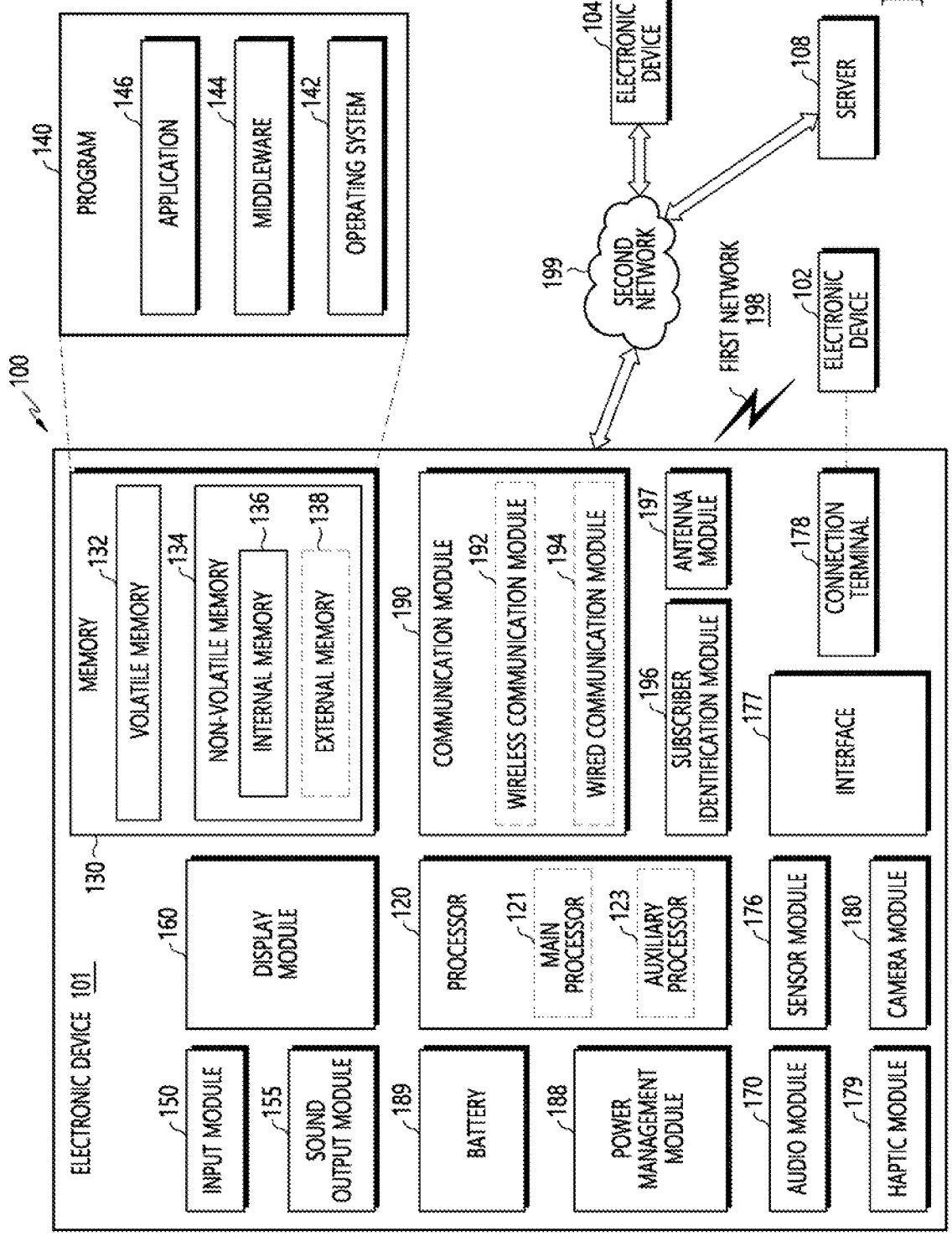
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, in describing various embodiments, the "position or height (e.g., height h of FIG. 2) of the blocking material (e.g., nanoparticles NP of FIG. 2)" may mean an area in which the nanoparticles are distributed in the slit (e.g., the slit 231 of FIG. 2). In some embodiments, the "position or height of the blocking material" may refer to the height of an area in which nanoparticles are distributed in the slit and may mean the height measured upward from a bottom end (e.g., the bottom end BE of FIG. 2) of the slit to a top end (e.g., the top end TE of FIG. 2).

Figure 2:
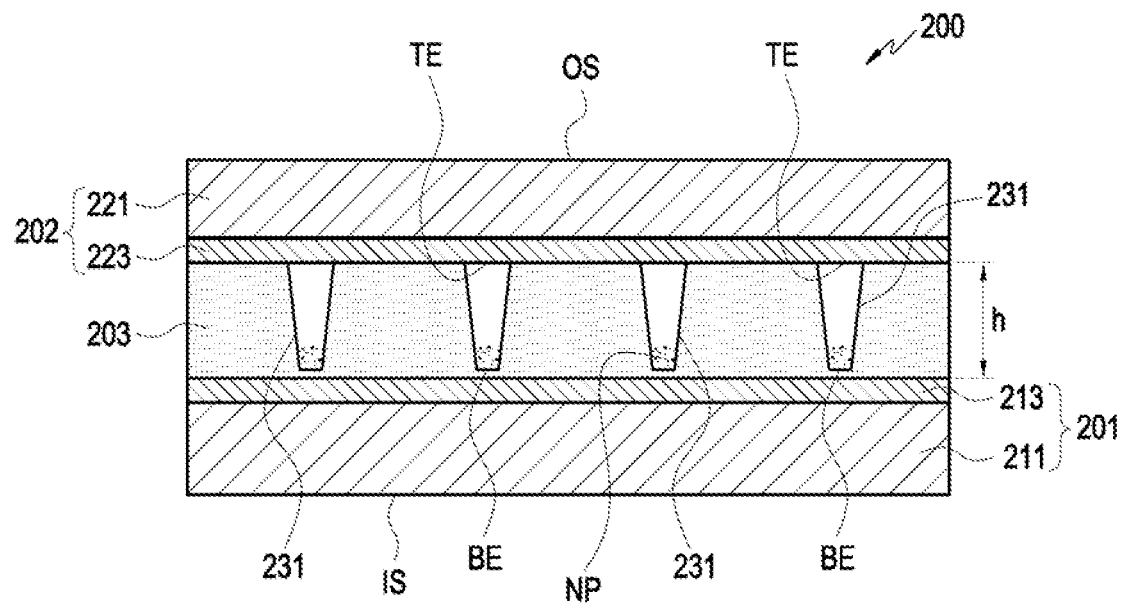
FIG. 2 is a cross-sectional view illustrating a configuration of a viewing angle adjusting member according to various embodiments.

FIG. 2 is a cross-sectional view illustrating a configuration of a viewing angle adjusting member 200 according to various embodiments.

Referring to FIG. 2, the viewing angle adjusting member 200 may include a first transparent film 201, a second transparent film 202, and/or a blocking material containing nanoparticles NP. The nanoparticles NP may be composed of a substance that is electrically charged in an electric field to be moved and blocks light. For example, the viewing angle adjusting member 200 may be a transparent member that substantially transmits light and may block part of the incident light and transmit the rest of the light depending on the position of the nanoparticles NP (e.g., the height with respect to the first transparent film 201 or the second transparent film 202) or distribution area. According to an embodiment, the first transparent film 201 and/or the second transparent film 202 may include transparent electrode layers 213 and 223, respectively. According to the electrical signal (e.g., voltage and/or current) applied to the transparent electrode layers 213 and 223, the nanoparticles NP may be moved.

According to various embodiments, the first transparent film 201 and the second transparent film 202 may respectively include base films 211 and 221 and transparent electrode layers 213 and 223 formed on respective first surfaces of the base films 211 and 221. The base films 211 and 221 may include a synthetic resin film that substantially transmits light. The transparent electrode layers 213 and 223 may include, e.g., a printed circuit pattern formed of an electrically conductive material, such as indium-tin oxide. Since the printed circuit pattern is so thin that it cannot be identified with the naked eye, the viewing angle adjusting member 200 may transmit light although including the electrode layers (e.g., the transparent electrode layers 213 and 223). In an embodiment, the strength of the electric field between the first transparent film 201 and the second transparent film 202 may be adjusted according to the electric signal applied to the transparent electrode layers 213 and 223, and the viewing angle control member 200 may adjust the position (e.g., height h) of the nanoparticles NP using the strength of the electric field.

According to various embodiments, the first transparent film 201 and the second transparent film 202 may be disposed to face each other with a predetermined interval between them. In an embodiment, the blocking material (e.g., nanoparticles NP) may be disposed in a space between the first transparent film 201 and the second transparent film 202. In some embodiments, the viewing angle adjusting member 200 further may include a transparent resin 203, so as to form a space or area where the blocking material is received while maintaining a gap between the first transparent film 201 and the second transparent film 202. For example, the transparent resin 203 may be disposed between the first transparent film 201 and the second transparent film 202 and may form or define a plurality of slits 231 disposed at designated intervals. The blocking material may be received into the slits 231.

According to various embodiments, the blocking material may include an electronic ink in which a solvent, a dispersing agent, and nanoparticles NP are mixed, and the nanoparticles NP may be moved in the slits 231 by electrophoresis. According to an embodiment, the nanoparticles NP may be referred to as "electrophoretic particles". For example, as the nanoparticles NP move inside the slits 231 according to the electrical signal applied to the transparent electrode layers 213 and 223, the distribution area or height h of the nanoparticles NP may be adjusted. According to an embodiment, the nanoparticles NP may include black inorganic ink micro-particles of at least one selected from special black, lamp black, and black spinel. As an example of the inorganic ink micro-particles, zinc iron manganese oxide (Zn, Fe, Mn) (Fe, Mn)$_2$O$_4$), magnesium aluminum oxide (MgAl$_2$O$_4$), iron chromium oxide (FeCr$_2$O$_4$), zinc aluminum oxide (ZnAl$_2$O$_4$), iron oxide (Fe$_3$O$_4$), cobalt iron oxide (CoFe$_2$O$_4$), or copper chromite (CuCr$_2$O$_4$) may be used and, in some embodiments, the nanoparticles NP (e.g., electrophoretic particles) contained in the blocking material may be composed of a mixture of two or more selected from the above-listed materials. In some embodiments, the nanoparticles NP may include styrene maleic anhydride copolymer (SMA)-coated special black particles, wax-coated copper chromite black spinel particles, or black charged particles, such as titanium dioxide (TiO$_2$), barium sulfate, kaolin, zinc oxide, carbon black, diarylide yellow, hansa yellow, benzidine yellow, lead chromate (PbCrO$_4$), cyan blue (GT 55-3295), and cibacron black (BG).

According to various embodiments, the solvent may be composed of a mixture of a polar solvent composed of water, alcohol, ethylene glycol, dimethylformamide, or a mixture thereof, a non-polar solvent composed of halogenated hydrocarbon oil (trade name "halocarbon" commercially available from Halogenated hydrocarbon Inc.), Galden (commercially available from Ausimont), Isopar (commercially available from Exxon Co., Ltd.)-based material, or a non-polar solvent composed of a mixture of the polar solvent and the non-polar solvent. In another embodiment, the solvent may include at least one selected from the group consisting of cyclohexyl vinyl ether, such as decane epoxide or dodecane epoxide, toluene, naphthalene, tetrafluorodibromotylene, tetrachloroethylene, 1,2,4-trichlorobenzene, carbon tetrachloride, dodecane, tetradecane, isopar-based solvents, and norpar-based solvents. In another embodiment, the solvent may include silicone oil, halogenated organic solvents, linear saturated hydrocarbons or branched hydrocarbon liquids or high molecular weight liquids containing low molecular weight halogens, halogenated organic solvents, or hydrocarbons. Various embodiments are not limited by the components of the solvents listed above. Appropriate components may be selected considering the dielectric properties or physical properties required in the viewing angle control member to be actually manufactured, and other non-listed solvents may be added.

According to various embodiments, the dispersing agent may be referred to as a "charge modifier" and may be composed of metal soap, OLOA series (commercially available from Chevron Oronite Inc.), Ganex series (commercially available from ISP Inc.), or a mixture thereof. In an embodiment, examples of the dispersing agent composed of metal soap may include Co-naphthenate, Ca-naphthenate, Cu-naphthenate, Mn-naphthenate, Zn-naphthenate, Fe-naphthenate, Ba-stearate, Al-stearate, Zn-stearate, Cu-stearate, Pb-stearate, Cr-stearate, Fe-stearate, Ba-octoate, Al-octoate, Ca-octoate, Co-octoate, Mn-octoate, Pb-octoate, Zr-octoate, or Zn-octoate. In another embodiment, as the dispersing agent, a surfactant having a hydrophile lipophile balance (HLB) of 3 or more, byk-190, byk-183 or tween-based surfactant, or byk-110, byk-161, byk-183, or tween or span-based surfactant may be used and, as an additive, hydrocarbon-based or alkyl benzene sulphonic acids having 12 to 50 carbon atoms, salts of fatty amines, glycol ethers, acetylenic glycols, alkanoranides, sorbitol-based surfactants, alkyl amines, tetravalent amines, or sulfosuccinates may be used. In the blocking material, the dispersing agent may not only prevent agglomeration of nanoparticles NP but also facilitate detachment of the electrophoretic particles attached to the electrode surface.

According to various embodiments, the slits 231 may be closed on one surface of the transparent resin 203 and be open on the other side and may be arranged at intervals of about 30 μm or more and 150 μm or less. According to an embodiment, when the outer surface of the first transparent film 201 is defined as an 'incident surface IS', the width S or S' of the slits 231 may gradually increase away from the incident surface IS. For example, the slits 231 may be formed to have a width S' of about 10 μm in positions closest to the incident surface IS and to have a width S of about 50 μm in positions farthest from the incident surface IS. However, various embodiments are not limited thereto, and the slits 231 may have a uniform width regardless of the distance from the incident surface IS. The width of the slits 231 may be appropriately selected considering the specifications of the viewing angle adjusting member to be actually manufactured, the intervals at which the slits 231 are arranged, or the effect of the slits 231 (or blocking material) on the image quality of the display. The blocking material may be received in the slits 231, and according to the electric signal applied to the transparent electrode layers 213 and 223, e.g., the nanoparticles NP may be moved inside the slits 231, allowing their distribution area or space and/or height h to be varied.

Figure 14:
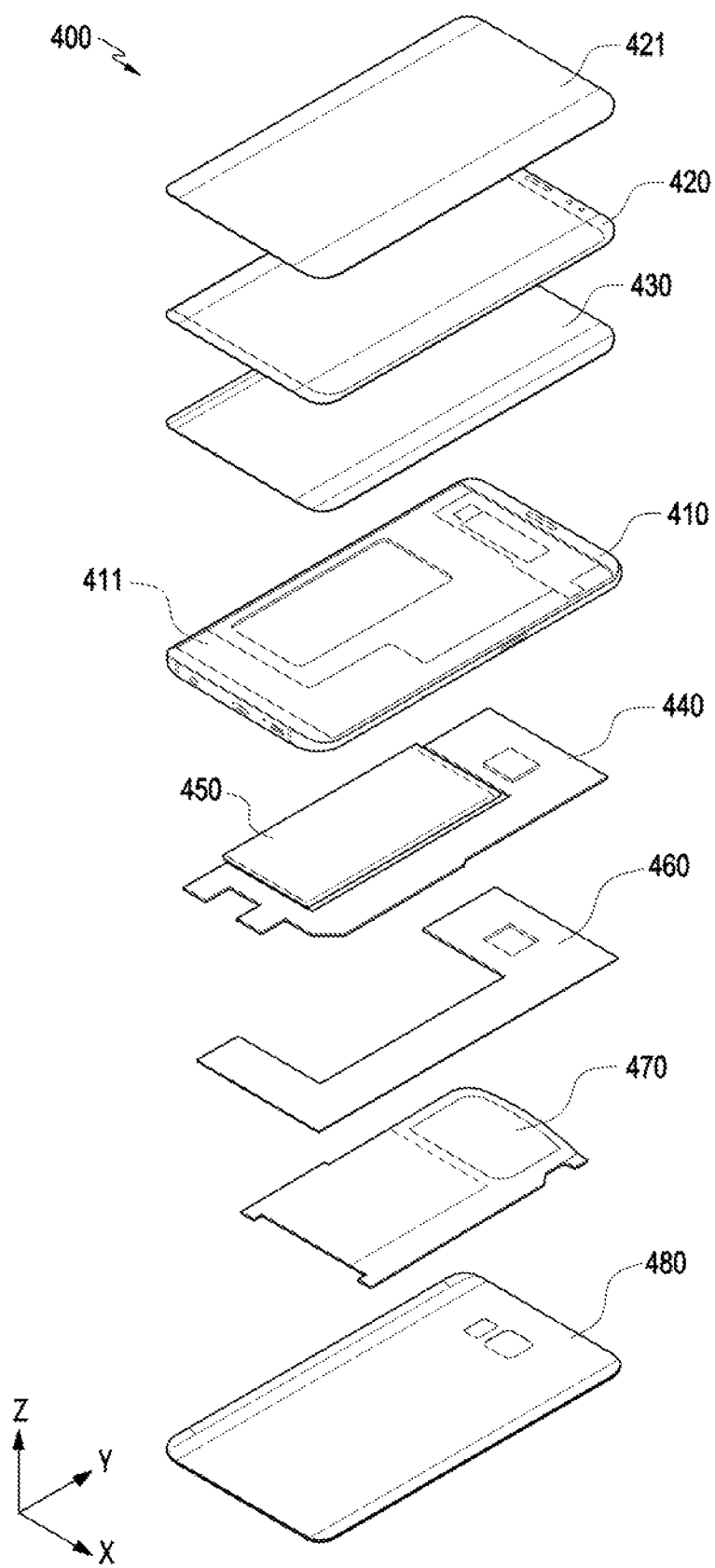
FIG. 14 is an exploded perspective view illustrating the electronic device of FIG. 12.

According to various embodiments, when viewed from one surface (e.g., the incident surface IS or the outer surface OS) of the viewing angle adjusting member 200, e.g., when the viewing angle adjusting member 200 or 421 is viewed along the -Z axis direction of FIG. 14, at least some of the slits 231 may be arranged parallel to each other. For example, with further reference to FIG. 14, the slits 421 may be arranged along the X-axis direction while extending along the Y-axis direction. The direction indicated as the height h in FIG. 2 may be substantially parallel to the Z-axis direction of FIG. 14. In another embodiment, first slits corresponding to some of the slits 231 may be disposed to cross second slits corresponding to the rest. Although the description of the arrangement of the slits 231 is described regarding the state in which the viewing angle adjusting member 200 is viewed from the outside, the slits 231 may not be substantially identified with the user's naked eye.

According to various embodiments, the blocking material, e.g., nanoparticles NP and/or electrophoretic particles may be moved inside the slits 231 according to the electrical signal applied to the transparent electrode layers 213 and 223 while the distribution or height h of the nanoparticles NP is adjusted. As the distribution area or height of the nanoparticles NP increases, the viewing angle adjusting member 200 may block more incident light and reduce the amount of transmitted light. The light blocked by the viewing angle adjusting member 200 may vary according to the incident angle incident on the incident surface IS. A change in the distribution area or height of the nanoparticles NP is described with further reference to FIGS. 3 to 8.

FIGS. 3, 4, 5, 6, 7, and 8 are views illustrating a configuration in which the position or height of a blocking material (e.g., nanoparticles NP) is adjusted in a viewing angle adjusting member 200 according to various embodiments.

FIGS. 3 to 8 show examples of the height of the blocking material (e.g., nanoparticles NP) according to the electric signal (e.g., voltage) applied to the transparent electrode layers 213 and 223. The total height of the slit 231 measured away from the position closest to the incident surface IS is defined as 100%, and the height of the blocking material according to the voltage of the applied electrical signal is described below.

Figure 3:
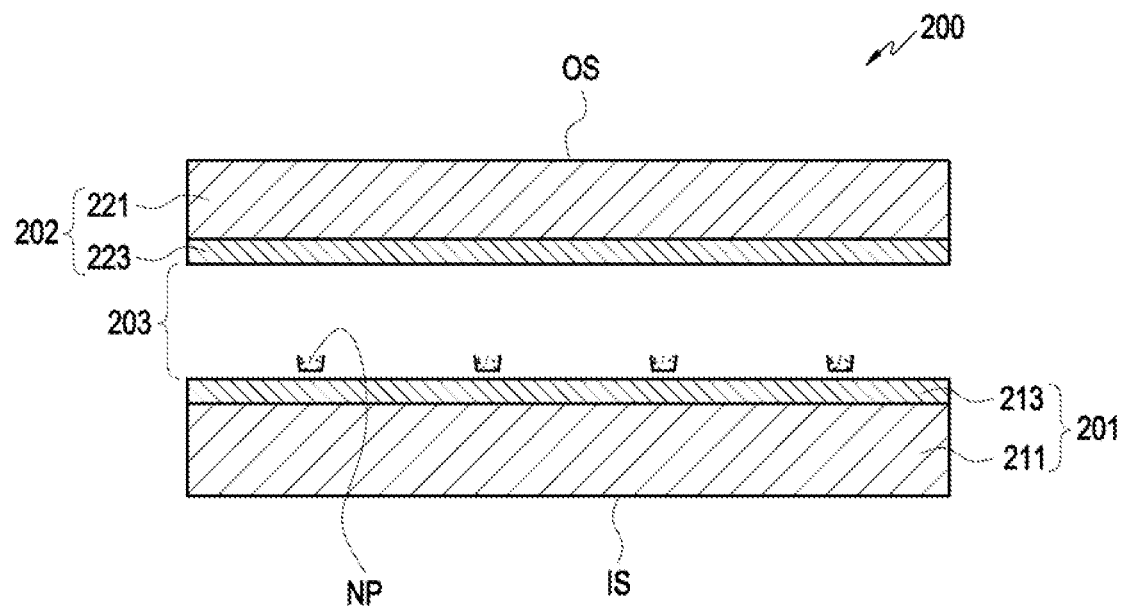
FIGS. 3, 4, 5, 6, 7, and 8 are views illustrating a configuration in which the position or height of a blocking material is adjusted in a viewing angle adjusting member according to various embodiments.
Figure 4:
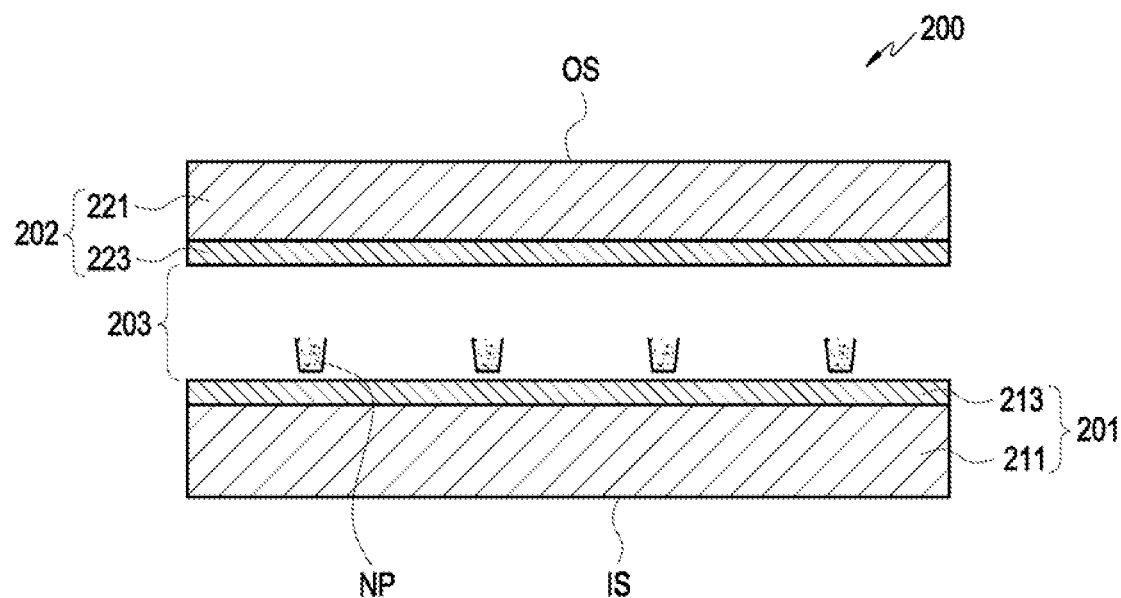
Figure 5:
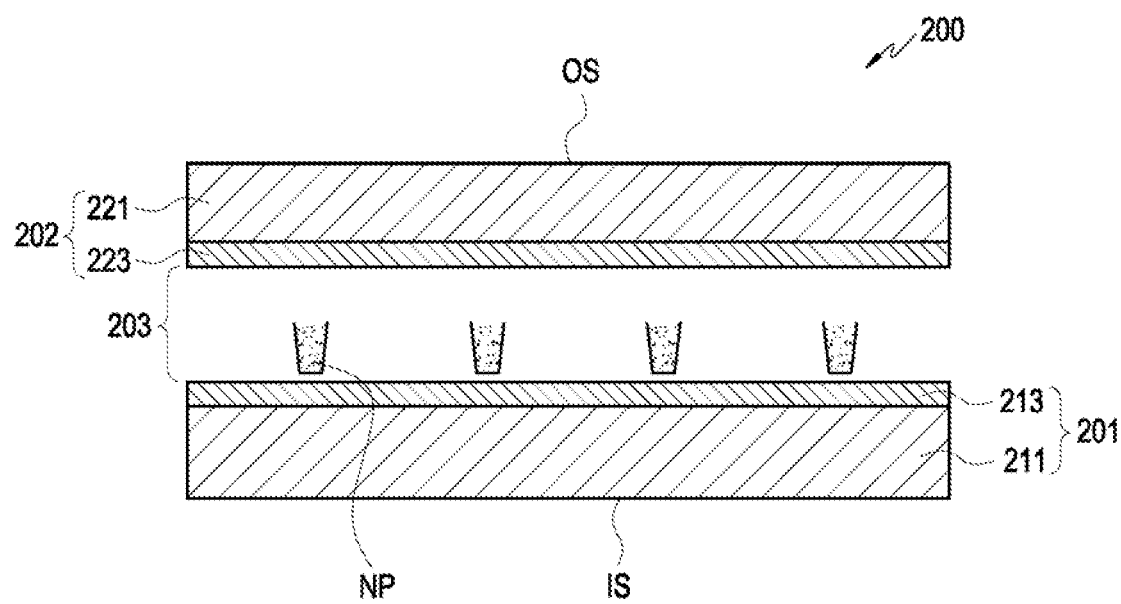
Figure 6:
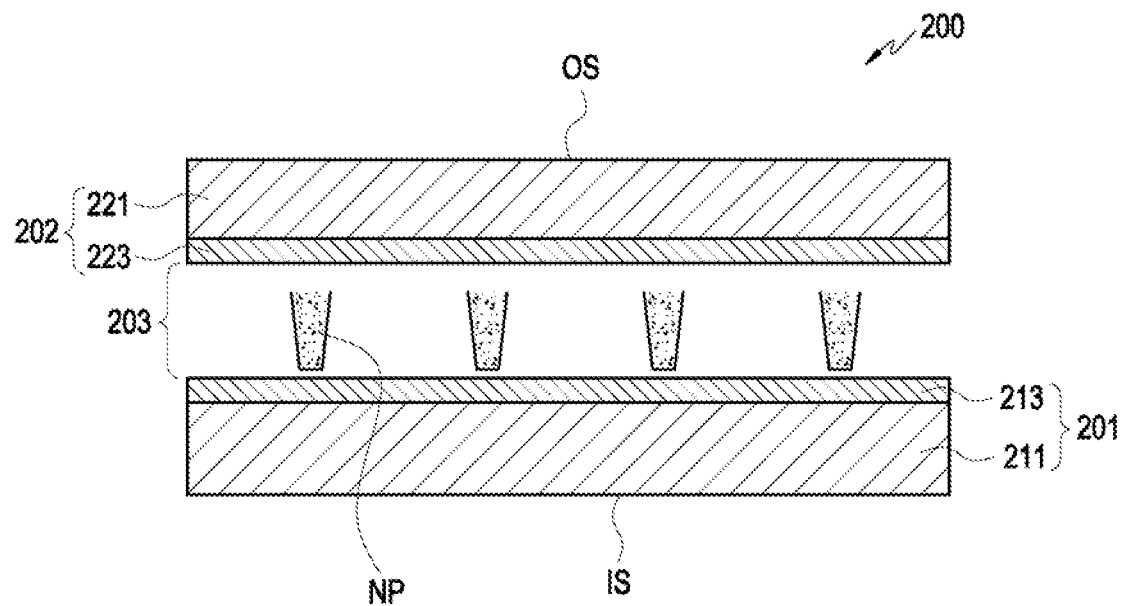
Figure 7:
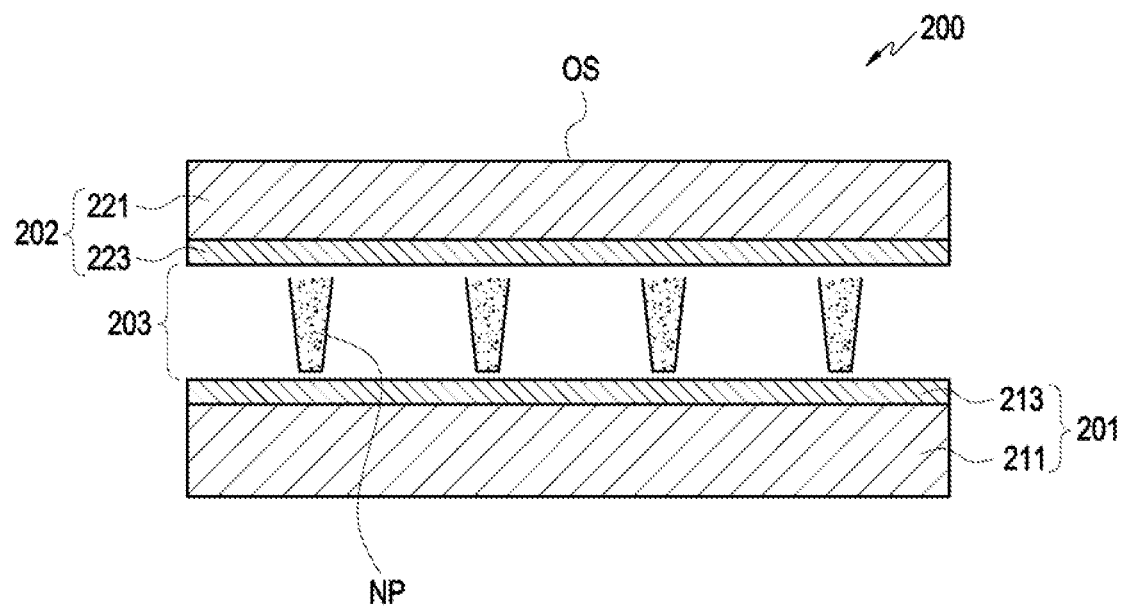
Figure 8:
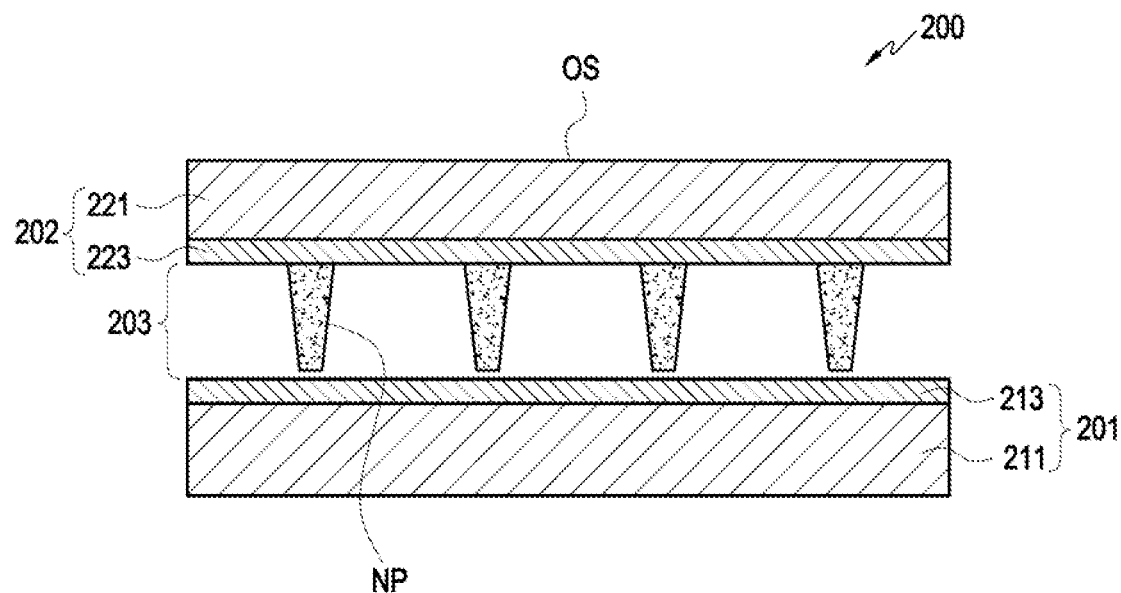

Referring to FIG. 3, it may be identified that the blocking material is distributed within about 10% of the total height of the slit 231 in a state where no electrical signal is applied. FIG. 4 shows an example of the height of the blocking material when an electrical signal of 0.1 mV is applied to the transparent electrode layers 213 and 223. FIG. 5 illustrates an example in which an electrical signal of 0.4 mV is applied. FIG. 6 illustrates an example in which an electrical signal of 0.7 mV is applied. FIG. 7 illustrates an example in which an electrical signal of 0.9 mV is applied. FIG. 8 illustrates an example in which an allowed maximum voltage of the electrical signal is applied. The maximum voltage may be, e.g., about 1.1 mV. As illustrated in FIGS. 3 to 8, as the voltage of the applied electrical signal increases, it may be identified that the height of the blocking material (e.g., nanoparticles NP and/or electrophoretic particles) gradually increases.

A structure in which the viewing angle adjusting member 200 selectively blocks light as the height of the blocking material is adjusted, e.g., according to the incident angle of the light incident on the incident surface IS is described in greater detail with reference to FIGS. 9, 10, and 11.

Figure 9:
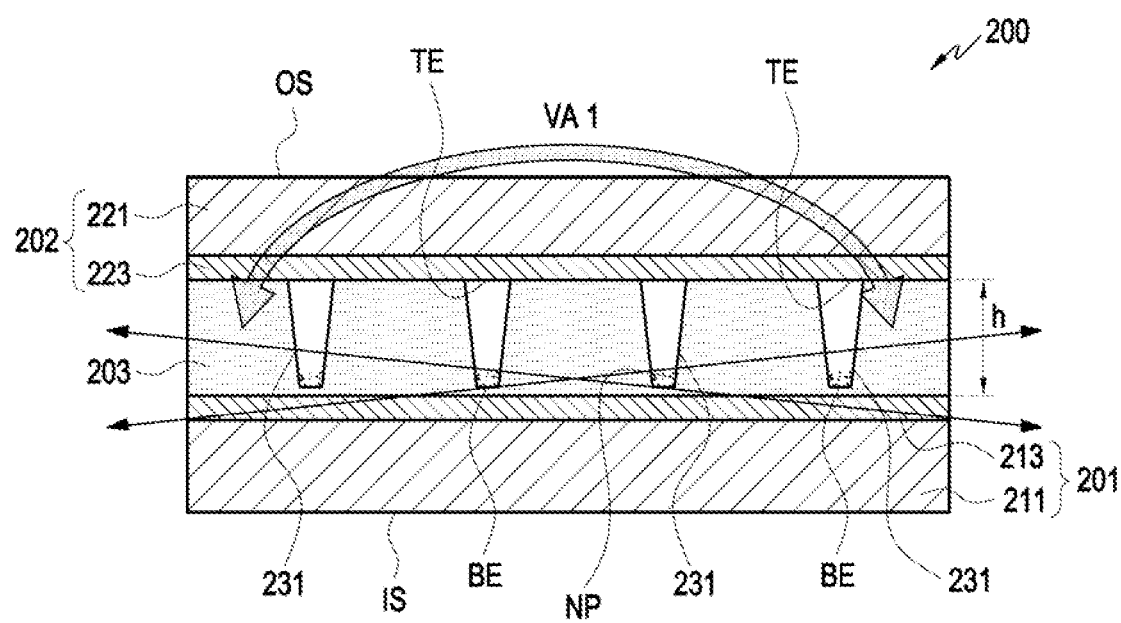
FIGS. 9, 10, and 11 are views illustrating a configuration in which a viewing angle is adjusted by a viewing angle adjusting member according to various embodiments.
Figure 10:
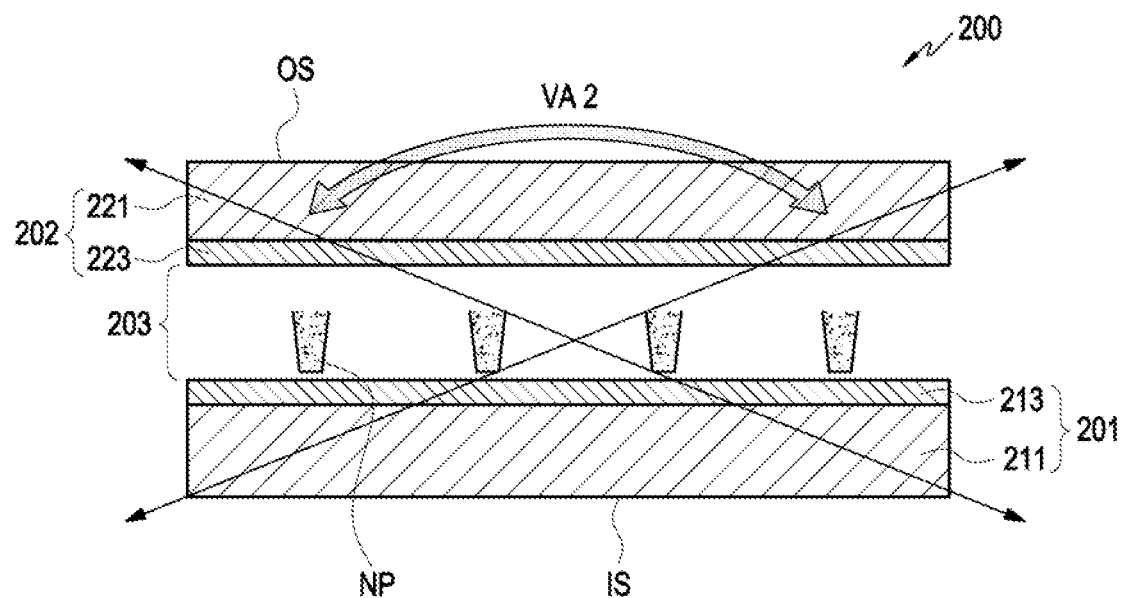
Figure 11:
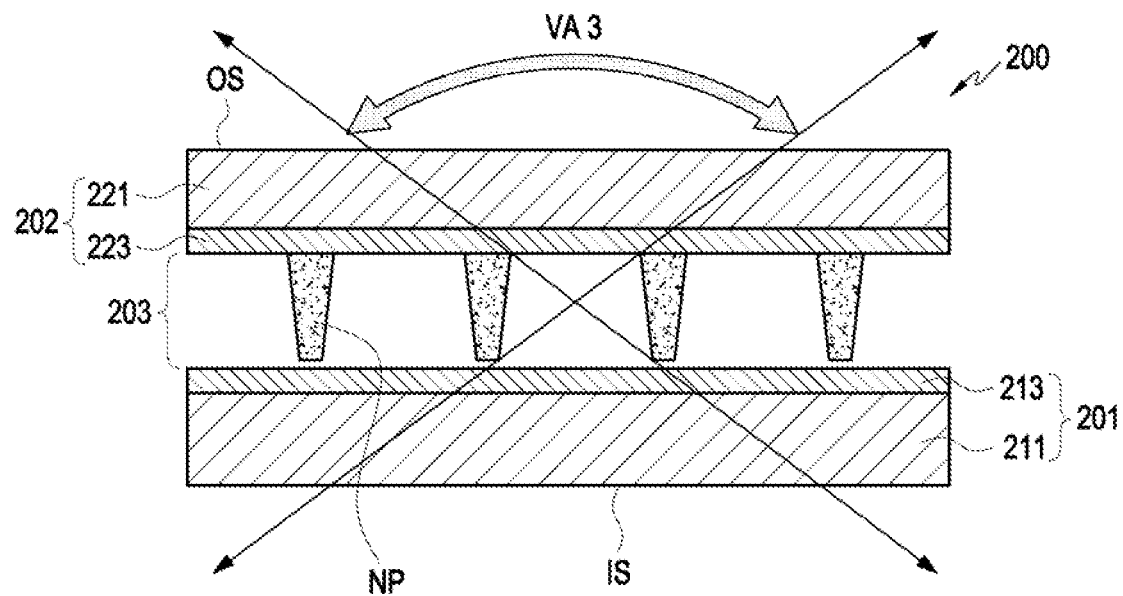

FIGS. 9, 10, and 11 are views illustrating a configuration in which a viewing angle is adjusted by a viewing angle adjusting member 200 according to various embodiments.

Referring to FIG. 9, in a state in which no electric signal is applied to the transparent electrode layers 213 and 223 (corresponding, e.g., to the state shown in FIG. 3), the blocking material (e.g., nanoparticles NP and/or electrophoretic particles) may be distributed within about 10% of the total height of the slit 231. In a state where no electrical signal is applied, e.g., in a state in which the blocking material (e.g., nanoparticles NP and/or electrophoretic particles) is distributed within about 10% of the total height of the slit, the viewing angle adjusting member 200 may transmit most of the light incident on the incident surface IS. In an embodiment, in a state in which the blocking material is distributed within about 10% of the total height of the slit 231, the viewing angle adjusting member 200 may provide a first viewing angle VA1 of about 140 degrees or less. For example, when the incident angle of the light incident perpendicular to the incident surface IS is defined as 0 degrees, in a state in which no electric signal is applied to the transparent electrode layers 213 and 223, the viewing angle adjusting member 200 may transmit light having an incident angle within about 70 degrees in both directions.

Referring to FIG. 10, when an electric signal of 0.4 mV is applied to the transparent electrode layers 213 and 223 (corresponding, e.g., to the state shown in FIG. 5), the blocking material may be distributed up to about 50% of the total height of the slit 231. In a state in which the blocking material is distributed up to about 50% of the total height of the slit 231, the viewing angle adjusting member 200 may provide a second viewing angle VA2 limited to 100 degrees or less. For example, in a state in which the blocking material is distributed up to about 50% of the total height of the slit 231, the viewing angle adjusting member may transmit the light having an incident angle within about 50 degrees in both directions and block the light having an incident angle exceeding 50 degrees in both directions.

Referring to FIG. 11, when an electric signal of a maximum voltage (e.g., about 1.1 mV) is applied to the transparent electrode layers 213 and 223 (corresponding, e.g., to the state shown in FIG. 8), the blocking material may be distributed over the entire area provided by the slit 231, and the viewing angle adjusting member 200 may provide a third viewing angle VA3 limited to about 60 degrees or less. For example, when the maximum voltage is applied to the transparent electrode layers 213 and 223, the viewing angle adjusting member 200 may transmit the light incident substantially perpendicular to the incident surface IS (e.g., light having an incident angle of 30 degrees or less in both directions) and block the light having an incident angle of about 30 degrees or more in both directions.

In some embodiments, the width S or S' of the slit 231 may gradually increase from the bottom end BE to the top end TE, e.g., gradually away from the incident surface IS. The shape of the slit 231 may increase the change in the viewing angle according to the change in the height of the blocking material. For example, if the viewing angle is changed by 10% due to a change of about 10% in the height of the blocking material in the structure in which the width S or S' of the slit 231 is uniform, then in a structure in which the width S or S' of the slit 231 is increased away from the incident surface IS, the viewing angle may be changed by 15% due to a change of about 10% in the height of the blocking material. In some embodiments, in a structure in which the viewing angle adjusting member 200 is disposed on the display (e.g., the display module 160 of FIG. 1 and/or the display 430 of FIG. 14), the width of the slit 231 or the blocking material may be cause of degrading the image quality of the display. According to various embodiments, in applying the viewing angle adjusting member 200 to the electronic device (e.g., the electronic devices 101, 102, 104, or 400 of FIG. 1 and/or 14) and/or the display, the width of the slit 231 may be appropriately selected considering the above-described viewing angle adjustment effect and the effect on the image quality of the display.

Figure 12:
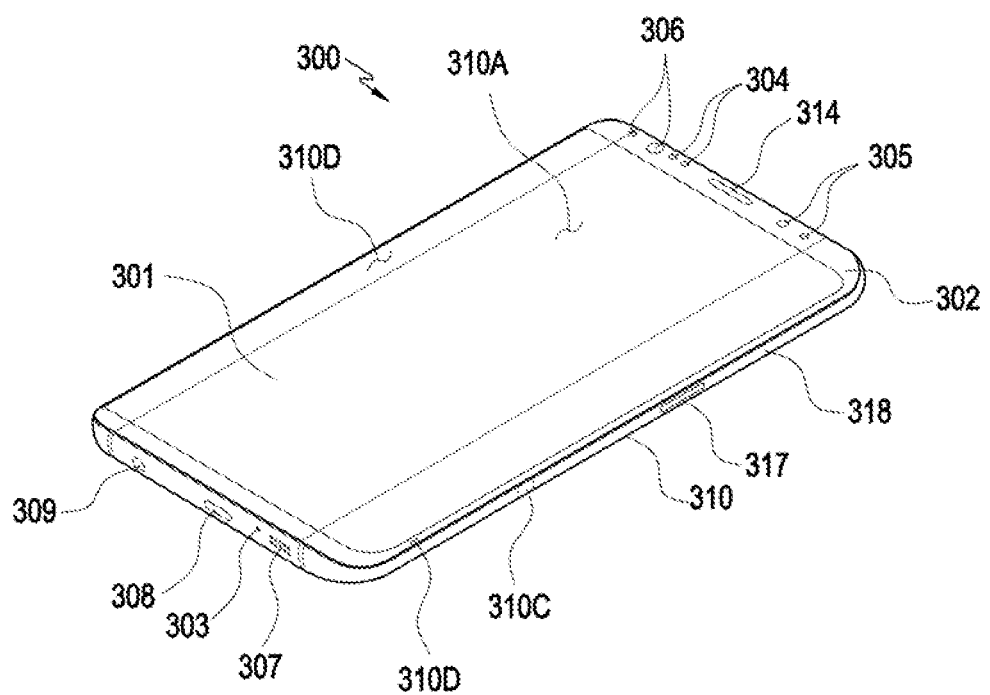
FIG. 12 is a front perspective view illustrating an electronic device according to various embodiments.
Figure 13:
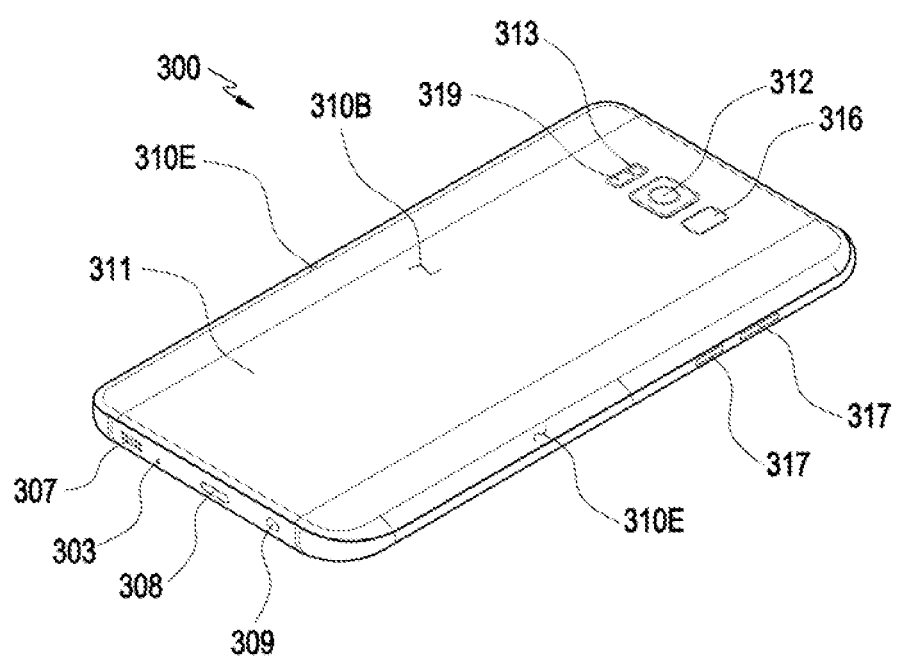
FIG. 13 is a rear perspective view illustrating the electronic device of FIGS. 12.

A display and/or an electronic device including the viewing angle adjusting member 200 according to various embodiments is described with further reference to FIGS. 12 to 14. In the detailed description of the display and/or the electronic device, reference may be further made to FIG. 2 regarding the viewing angle adjusting member.

FIG. 12 is a front perspective view illustrating an electronic device 300 (e.g., the electronic device 101, 102, or 104 of FIG. 1) according to various embodiments. FIG. 13 is a rear perspective view illustrating the electronic device 300 of FIG. 12.

Referring to FIGS. 12 and 13, according to an embodiment, an electronic device 300 may include a housing 310 with a first (or front) surface 310A, a second (or rear) surface 310B, and a side surface 310C surrounding a space between the first surface 310A and the second surface 310B. According to another embodiment, the housing 310 may denote a structure forming the first surface 310A of FIG. 1, the second surface 310B of FIG. 2, and some of the side surfaces 310C. According to an embodiment, the first surface 310A may be formed by a front plate 302 (e.g., a glass plate or polymer plate with various coat layers) at least part of which is substantially transparent. According to another embodiment, the front plate 302 may be coupled with the housing 310 and, along with the housing 310, may form an internal space. Here, the 'internal space' may mean a space between the front plate 302 and a first supporting member (e.g., the first supporting member 411 of FIG. 14) described below. According to an embodiment, the 'internal space' may mean a space, as an internal space of the housing 310, for receiving at least part of the display 430 of FIG. 14 or the display 301 described below.

According to various embodiments, the second surface 310B may be formed of a substantially opaque rear plate 311. The rear plate 311 may be formed of, e.g., laminated or colored glass, ceramic, polymer, metal (e.g., aluminum, stainless steel (STS), or magnesium), or a combination of at least two thereof The side surface 310C may be formed by a side bezel structure (or a "side member") 318 that couples to the front plate 302 and the rear plate 311 and includes a metal and/or polymer. According to various embodiments, the rear plate 311 and the side bezel structure 318 may be integrally formed together and include the same material (e.g., a metal, such as aluminum).

In the embodiment illustrated, the front plate 302 may include two first areas 310D (e.g., curved areas), which seamlessly and bendingly extend from the first surface 310A to the rear plate 311, on both the long edges of the front plate 302. In the embodiment (refer to FIG. 13) illustrated, the rear plate 311 may include second areas 310E (e.g., curved areas), which seamlessly and bendingly extend from the second surface 310B to the front plate 302, on both the long edges. According to various embodiment, the front plate 302 (or the rear plate 311) may include only one of the first areas 310D (or the second areas 310E). Alternatively, the first areas 310D or the second areas 301E may partially be excluded. In the above-described embodiments, in a side view of the electronic device 300, the side bezel structure 318 may have a first thickness (or width) for sides (e.g., the side where connector hole 308 is formed) that do not have the first areas 310D or the second areas 310E and a second thickness, which is smaller than the first thickness, for sides (e.g., the side where key input device 317 is disposed) that have the first areas 310D or the second areas 310E.

According to an embodiment, the electronic device 300 may include at least one or more of a display 301, audio modules 303, 307, and 314, sensor modules 304, 316, and 319, camera modules 305, 312, and 313, key input devices 317, a light emitting device 306, and connector holes 308 and 309. According to various embodiments, the electronic device 300 may exclude at least one (e.g., the key input device 317 or the light emitting device 306) of the components or may add other components.

The display 301 may be exposed through a significant portion of the front plate 302. According to various embodiments, at least a portion of the display 301 may be exposed through the front plate 302 forming the first surface 310A and the first areas 310D of the side surface 310C. According to an embodiment, the edge of the display 301 may be formed to be substantially the same in shape as an adjacent outer edge of the front plate 302. According to another embodiment, the interval between the outer edge of the display 301 and the outer edge of the front plate 302 may remain substantially even to give a larger area of exposure the display 301.

According to an embodiment, the surface (or the front plate 302) of the housing 310 may include a screen display area formed as the display 301 is visually exposed. As an example, the screen display area may include a front surface 310A and a first area 310D (e.g., curved areas).

According to another embodiment (not shown), the screen display area (e.g., the active area), or an area (e.g., the inactive area) off the screen display area, of the display 301 may have a recess or opening in a portion thereof, and at least one or more of the audio module 314, sensor module 304, a camera module 305, and light emitting device 306 may be aligned with the recess or opening. According to another embodiment, at least one or more of the audio module 314, sensor module 304, camera module 305, fingerprint sensor 316, and light emitting device 306 may be included on the rear surface of the screen display area of the display 301. According to an embodiment, the display 301 may be disposed to be coupled with, or adjacent to, a touch detecting circuit, a pressure sensor capable of measuring the strength (pressure) of touches, and/or a digitizer for detecting a magnetic field-type stylus pen. According to an embodiment, at least part of the sensor modules 304 and 319 and/or at least part of the key input device 317 may be disposed in the first areas 310D and/or the second areas 310E.

The audio modules 303, 307, and 314 may include a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. According to an embodiment, the speaker holes 307 and 314 and the microphone hole 303 may be implemented as a single hole, or speakers may be rested without the speaker holes 307 and 314 (e.g., piezo speakers).

The sensor modules 304, 316, and 319 may generate an electrical signal or data value corresponding to an internal operating state or external environmental state of the electronic device 300. The sensor modules 304, 316, and 319 may include a first sensor module 304 (e.g., a proximity sensor) disposed on the first surface 310A of the housing 310, and/or a second sensor module (e.g., a fingerprint sensor), and/or a third sensor module 319 (e.g., a heart-rate monitor (HRM) sensor) disposed on the second surface 310B of the housing 310, and/or a fourth sensor module 316 (e.g., a fingerprint sensor). The fingerprint sensor may be disposed on the second surface 310B as well as the first surface 310A (e.g., the display 301) of the housing 310. The electronic device 300 may further include, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may include one or more lenses, an image sensor, and/or an image signal processor. The flash 313 may include, e.g., a light emitting diode (LED) or a xenon lamp. According to an embodiment, four or more lenses (an infrared (IR) camera, a wide-angle lens, and a telescopic lens) and image sensors may be disposed on one surface of the electronic device 300.

The key input device 317 may be disposed on the side surface 310C of the housing 310. According to an embodiment, the electronic device 300 may exclude all or some of the above-mentioned key input devices 317 and the excluded key input devices 317 may be implemented in other forms, e.g., as soft keys, on the display 301. According to an embodiment, the key input device may include the sensor module 316 disposed on the second surface 310B of the housing 310.

The light emitting device 306 may be disposed on, e.g., the first surface 310A of the housing 310. The light emitting device 306 may provide, e.g., information about the state of the electronic device 300 in the form of light. According to an embodiment, the light emitting device 306 may provide a light source that interacts with, e.g., the camera module 305. The light emitting device 306 may include, e.g., a light emitting diode (LED), an infrared (IR) LED, or a xenon lamp.

The connector holes 308 and 309 may include a first connector hole 308 for receiving a connector (e.g., a universal serial bus (USB) connector) for transmitting or receiving power and/or data to/from an external electronic device and/or a second connector hole 309 (e.g., an earphone jack) for receiving a connector for transmitting or receiving audio signals to/from the external electronic device.

FIG. 14 is an exploded perspective view illustrating the electronic device 400 of FIG. 12.

Referring to FIG. 14, an electronic device 400 may include a side bezel structure 410, a first supporting member 411 (e.g., a bracket), a front plate 420, a display 430, a printed circuit board 440, a battery 450, a second supporting member 460 (e.g., a rear case), an antenna 470, a viewing angle adjusting member 421, and a rear plate 480. According to an embodiment, the electronic device 400 may exclude at least one (e.g., the first supporting member 411 or the second supporting member 460) of the components or may add other components. At least one of the components of the electronic device 400 may be the same or similar to at least one of the components of the electronic device 300 of FIG. 12 or 13 and no duplicate description is made below.

The first supporting member 411 may be disposed inside the electronic device 400 to be connected with the side bezel structure 410 or integrated with the side bezel structure 410. The first supporting member 411 may be formed of, e.g., a metallic material and/or non-metallic material (e.g., polymer). The display 430 may be joined onto one surface of the first supporting member 411, and the printed circuit board 440 may be joined onto the opposite surface of the first supporting member 411. A processor, a memory, and/or an interface (e.g., the processor 120, the memory 130, and/or the interface 177 of FIG. 1) may be mounted on the printed circuit board 440. The processor may include one or more of, e.g., a central processing unit, an application processor, a graphic processing device, an image signal processing, a sensor hub processor, or a communication processor.

Substantially the entire area of the display 430 may be attached on an inner surface of the front plate 420, and an opaque layer may be formed around or along the periphery of the area where the display 430 is attached on the inner surface of the front plate 420. In the area of the front plate 420 where the display 430 is not disposed, the opaque layer may prevent part of the internal structure (e.g., the first supporting member 411) of the electronic device 400 from being visually exposed to the outside.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 400 with an external electronic device and may include a USB connector, an SD card/multimedia card (MMC) connector, or an audio connector.

The battery 450 may be a device for supplying power to at least one component of the electronic device 400. The battery 450 may include, e.g., a primary cell which is not rechargeable, a secondary cell which is rechargeable, or a fuel cell. At least a portion of the battery 450 may be disposed on substantially the same plane as the printed circuit board 440. The battery 450 may be integrally or detachably disposed inside the electronic device 400.

The antenna 470 may be disposed between the rear plate 480 and the battery 450. The antenna 470 may include, e.g., a near-field communication (NFC) antenna, a wireless charging antenna, and/or a magnetic secure transmission (MST) antenna. The antenna 470 may perform short-range communication with, e.g., an external device or may wirelessly transmit or receive power necessary for charging. According to an embodiment, an antenna structure may be formed by a portion or combination of the side bezel structure 410 and/or the first supporting member 411.

According to various embodiments, the viewing angle adjusting member 421 (e.g., the viewing angle adjusting member 200 of FIG. 2) may be disposed on a surface of the front plate 420 (e.g., a window member). In the illustrated embodiment, the viewing angle adjusting member 421 is disposed on the outer surface of the front plate 420, but various embodiments are not limited thereto. The viewing angle adjusting member 421 may be disposed in any position so long as it is disposed at the front of the display 430 on the electronic device 400 (e.g., between the front plate 420 and the display 430). In an embodiment, the viewing angle adjusting member 421 may be disposed such that the incident surface (e.g., the incident surface IS of FIG. 2) faces the display 430, and the outer surface (e.g., the outer surface OS of FIG. 2) faces an external space of the electronic device 400.

According to various embodiments, the width S or S' of the slit 231 may gradually increase away from the display 430 along the Z-axis direction. For example, the bottom end BE of the slit 231 exemplified in FIG. 2 may be disposed to face the display 430. In some embodiments, as viewed from outside of the electronic device 400, multiple slits 231 may extend in the X-axis direction and/or the Y-axis direction. For example, the slits 231 may extend in the Y-axis direction and be arranged along the X-axis direction at intervals of about 30 μm to 150 μm. In some embodiments, the slits 231 may be arranged to cross each other. For example, the viewing angle adjusting member 421 and/or the electronic device 400 may include slits 231 extending or arranged to cross each other. In the instant embodiment, although the "state viewed from outside of the electronic device 400" regarding the arrangement of the slits is described as an example, the slits may not be identified with the user's naked eye.

According to various embodiments, the electronic device 400, e.g., the processor 120 of FIG. 1 may be configured to apply an electrical signal to at least one of the transparent electrode layers 213 and 223 of the viewing angle adjusting member 421. According to an embodiment, the processor 120 may be configured to adjust the height of the blocking material (e.g., nanoparticles and/or electrophoretic particles) by applying a designated voltage of electrical signal to the transparent electrode layers 213 and 223. As described above, the viewing angle adjusting member 421 may selectively transmit light depending on the height of the blocking material, and the electronic device 400 may adjust the viewing angle of the display 430 using the viewing angle adjusting member 421. For example, when an electrical signal of 0.4 mV is applied to the transparent electrode layers 213 and 223, the electronic device 400 and/or the display 430 may have a viewing angle of about 100 degrees, and when an electric signal of the maximum voltage is applied, the viewing angle of the electronic device 400 and/or the display 430 may be limited to about 60 degrees.

The electronic device 300 or 400 disclosed in FIGS. 12 to 14 has a bar-type or plate-type appearance but the disclosure is not limited thereto. For example, the illustrated electronic device may be part of a rollable electronic device or a foldable electronic device. "Rollable electronic device" may mean an electronic device at least a portion of which may be wound or rolled or received in a housing (e.g., the housing 310 of FIG. 12) as the display (e.g., the display 430 of FIG. 14) may be bent and deformed. As the display is stretched out or is exposed to the outside in a larger area according to the user's need, the rollable electronic device may use an expanded second display area. "Foldable electronic device" may mean an electronic device that may be folded in directions to face two different areas of the display or in directions opposite to each other. In general, in the portable state, the foldable electronic device may be folded so that the two different areas of the display face each other and, in an actual use state, the user may unfold the display so that the two different areas form a substantially flat shape. In some embodiments, according to various embodiments, the electronic device 300 or 400 may be interpreted as including various electronic devices, such as a laptop computer or a home appliance, as well as a portable electronic device, such as a smart phone. In another embodiment, the electronic device 300 or 400 and/or the display may be interpreted as encompassing various devices that may be encountered in real life, such as an automatic teller machine or a touch-screen-adopted door lock, and any display that is disposed in a piece of equipment or space requiring security may include the above-described viewing angle adjusting member.

As described above, according to various embodiments, a viewing angle adjusting member (e.g., the viewing angle adjusting member 200 or 421 of FIG. 2 and/or FIG. 14) and an electronic device (e.g., the electronic device 101, 102, 103, 300, or 400 of FIGS. 12 to 14) may include a first transparent film (e.g., the first transparent film 201 of FIG. 2) including a first transparent electrode layer (e.g., the transparent electrode layer 213 of FIG. 2), a second transparent film (e.g., the second transparent film 202 of FIG. 2) including a second transparent electrode layer (e.g., the transparent electrode layer 223 of FIG. 2), and a blocking material disposed between the first transparent film and the second transparent film and containing nanoparticles (e.g., the nanoparticles NP of FIG. 2) blocking light. The viewing angle adjusting member may be configured to adjust a position of the nanoparticles according to an electrical signal applied to at least one of the first transparent electrode layer and the second transparent electrode layer.

According to various embodiments, the viewing angle adjusting member may be configured to selectively transmit light incident on one surface according to an incident angle of incident light by adjusting a height of the nanoparticles.

According to various embodiments, the viewing angle adjusting member may further comprise a transparent resin (e.g., the transparent resin 203 of FIG. 2) disposed between the first transparent film and the second transparent film to form a plurality of slits (e.g., the slits 231 of FIG. 2) disposed by a designated interval. The blocking material may be received in the slits.

According to various embodiments, when viewed from one surface of the viewing angle adjusting member, at least some of the slits may be arranged parallel to each other.

According to various embodiments, the width of the slits may gradually increase away from the surface on which light is incident.

According to various embodiments, the slits may be formed with a width of 10 μm or more and 50 μm or less.

According to various embodiments, the slits may be arranged by an interval of 30 μm or more and 150 μm or less.

According to various embodiments, the blocking material may include an electronic ink including a mixture of a solvent, a dispersing agent, and the nanoparticles. The nanoparticles may be charged in an electric field and moved to block light.

According to various embodiments, the nanoparticles may include black inorganic ink micro-particles of at least one selected from among special black, lamp black, and black spinel.

According to various embodiments, an electronic device (e.g., the electronic device 101, 102, 104, 300, or 400 of FIG. 1 and/or FIGS. 12 to 14) may include a housing (e.g., the housing 310 or 410 of FIGS. 12 to 14), a display (e.g., the display 301 or 430 of FIG. 12 and/or FIG. 14) disposed on one surface of the housing, and a viewing angle adjusting member (e.g., the viewing angle adjusting member 200 or 421 of FIG. 2 and/or FIG. 14) disposed on a surface of the display. The viewing angle adjusting member may include a first transparent film including a first transparent electrode layer, a second transparent film including a second transparent electrode layer, and a blocking material disposed between the first transparent film and the second transparent film and containing nanoparticles blocking light. The viewing angle adjusting member may be configured to adjust a position of the nanoparticles according to an electrical signal applied to at least one of the first transparent electrode layer and the second transparent electrode layer.

According to various embodiments, the viewing angle adjusting member may be configured to selectively transmit light incident on one surface according to an incident angle of incident light by adjusting a height of the nanoparticles.

According to various embodiments, the electronic device and/or the viewing angle adjusting member may further comprise a transparent resin disposed between the first transparent film and the second transparent film to form a plurality of slits disposed by a designated interval. The blocking material may be received in the slits.

According to various embodiments, when viewed from one surface of the viewing angle adjusting member, at least some of the slits may be arranged parallel to each other.

According to various embodiments, the width of the slits may gradually increase away from the surface on which light is incident.

According to various embodiments, the slits may be formed with a width of 10 μm or more and 50 μm or less.

According to various embodiments, the slits may be arranged by an interval of 30 μm or more and 150 μm or less.

According to various embodiments, the blocking material may include an electronic ink including a mixture of a solvent, a dispersing agent, and the nanoparticles. The nanoparticles may be charged in an electric field and moved to block light.

According to various embodiments, the nanoparticles may include black inorganic ink micro-particles of at least one selected from among special black, lamp black, and black spinel.

According to various embodiments, the electronic device may further comprise a processor (e.g., the processor 120 of FIG. 1). The processor may be configured to apply an electrical signal to at least one of the first transparent electrode layer and the second transparent electrode layer to adjust the position of the nanoparticles.

According to various embodiments, the electronic device and/or the viewing angle adjusting member may further comprise a transparent resin disposed between the first transparent film and the second transparent film to form a plurality of slits disposed by a designated interval. The width of the slits may gradually increase away from the surface on which light is incident. The blocking material may be received in the slits.

While the disclosure has been shown and described with reference to example embodiments thereof, it will be apparent to those of ordinary skill in the art that various changes in form and detail may be made thereto without departing from the spirit and scope as defined by the following claims. For example, in describing the above-described embodiments, specific example numerical values are described with respect to the viewing angle according to the interval or width of the slits, the voltage of the electric signal applied to the transparent electrode layers, and/or the height of the blocking material. However, various embodiments are not limited thereto, and various changes may be made to these numerical values according to specifications required for an electronic device or a viewing angle adjusting member to be actually manufactured.

What is claimed is:

1. A viewing angle adjusting member comprising:
   a first transparent film comprising a first transparent electrode layer;
   a second transparent film comprising a second transparent electrode layer; and
   a blocking material provided between the first transparent film and the second transparent film, the blocking material comprising nanoparticles configured to block light,
   wherein the viewing angle adjusting member is configured to apply an electrical signal to at least one of the first transparent electrode layer and the second transparent electrode layer to adjust a position or a distribution area of the nanoparticles between the first transparent film and the second transparent film, and
   wherein the viewing angle adjusting member is configured to selectively transmit light incident on one surface of the viewing angle adjusting member according to an incident angle of the incident light by adjusting a height of the nanoparticles.

2. The viewing angle adjusting member of claim 1, further comprising a transparent resin provided between the first transparent film and the second transparent film to form a plurality of slits at a designated interval, and
   wherein the blocking material is disposed in the plurality of slits.

3. The viewing angle adjusting member of claim 2, wherein when viewed from one surface of the viewing angle adjusting member, at least some of the plurality of slits are arranged parallel to each other.

4. The viewing angle adjusting member of claim 2, wherein the plurality of slits are formed with a width of 10 µm or more and 50 µm or less.

5. The viewing angle adjusting member of claim 2, wherein the plurality of slits are arranged at the designated interval of 30 µm or more and 150 µm or less.

6. The viewing angle adjusting member of claim 1, wherein the blocking material comprises an electronic ink comprising a mixture of a solvent, a dispersing agent, and the nanoparticles, and
   wherein the nanoparticles are charged in an electric field and moved to block light.

7. The viewing angle adjusting member of claim 6, wherein the nanoparticles comprise black inorganic ink micro-particles of at least one selected from among special black, lamp black, and black spinel.

8. An electronic device comprising:
   a housing;
   a display provided on one surface of the housing; and
   a viewing angle adjusting member provided on a surface of the display,
   wherein the viewing angle adjusting member comprises:
      a first transparent film comprising a first transparent electrode layer;
      a second transparent film comprising a second transparent electrode layer; and
      a blocking material disposed between the first transparent film and the second transparent film, the blocking material comprising nanoparticles configured to block light,
   wherein the viewing angle adjusting member is configured to adjust a viewing angle of the display by applying an electrical signal to at least one of the first transparent electrode layer and the second transparent electrode layer to adjust a position of the nanoparticles between the first transparent film and the second transparent film, and
   wherein the viewing angle adjusting member is configured to selectively transmit light incident on one surface of the viewing angle adjusting member according to an incident angle of the incident light by adjusting a height of the nanoparticles.

9. The electronic device of claim 8, further comprising a transparent resin disposed between the first transparent film and the second transparent film to form a plurality of slits at a designated interval, and
   wherein the blocking material is disposed in the plurality of slits.

10. The electronic device of claim 9, wherein when viewed from a surface of the viewing angle adjusting member, at least some of the plurality of slits are arranged parallel to each other.

11. The electronic device of claim 9, wherein the plurality of slits are formed with a width of 10 µm or more and 50 µm or less.

12. The electronic device of claim 9, wherein the plurality of slits are arranged at the designated interval of 30 µm or more and 150 µm or less.

13. The electronic device of claim 8, wherein the blocking material comprises an electronic ink comprising a mixture of a solvent, a dispersing agent, and the nanoparticles, and
    wherein the nanoparticles are charged in an electric field and moved to block light.

14. The electronic device of claim 13, wherein the nanoparticles comprise black inorganic ink micro-particles of at least one selected from among special black, lamp black, and black spinel.

15. The electronic device of claim 8, further comprising a processor configured to control the viewing angle adjusting member to apply the electrical signal to the at least one of the first transparent electrode layer and the second transparent electrode layer to adjust the position of the nanoparticles.

16. The electronic device of claim 15, further comprising a transparent resin provided between the first transparent film and the second transparent film to form a plurality of slits at a designated interval, and
    wherein the blocking material is disposed in the plurality of slits.

* * * * *